(12) United States Patent
Reinberger et al.

(10) Patent No.: US 8,274,799 B2
(45) Date of Patent: *Sep. 25, 2012

(54) CONTROL ARRANGEMENT FOR A RESONANT MODE POWER CONVERTER

(75) Inventors: Anthony Reinberger, Nepean (CA); Paul Demone, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,649

(22) Filed: Aug. 4, 2011

(65) Prior Publication Data
US 2012/0057372 A1   Mar. 8, 2012

Related U.S. Application Data

(63) Continuation of application No. 12/939,058, filed on Nov. 3, 2010, now Pat. No. 8,014,172, which is a continuation of application No. 12/016,933, filed on Jan. 18, 2008, now Pat. No. 7,848,117.

(60) Provisional application No. 60/881,480, filed on Jan. 22, 2007.

(51) Int. Cl.
  *H02M 3/335*   (2006.01)
(52) U.S. Cl. ............. 363/13; 363/140; 363/49; 323/207
(58) Field of Classification Search ............... 363/16.14, 363/41, 49; 323/207
  See application file for complete search history.

(56) References Cited

U.S. PATENT DOCUMENTS

| | | | |
|---|---|---|---|
| 5,450,305 A * | 9/1995 | Boys et al. ................... 363/24 |
| 5,500,792 A | 3/1996 | Jeon et al. | |
| 5,510,974 A | 4/1996 | Gu et al. | |
| 5,565,761 A | 10/1996 | Hwang | |
| 5,598,326 A | 1/1997 | Liu et al. | |
| 5,629,841 A | 5/1997 | Attwood | |
| 5,642,065 A | 6/1997 | Choi et al. | |
| 5,757,166 A | 5/1998 | Sodhi | |
| 5,798,635 A | 8/1998 | Hwang et al. | |
| 6,181,079 B1 | 1/2001 | Chang et al. | |
| 6,215,288 B1 | 4/2001 | Ramsey et al. | |
| 6,249,876 B1 | 6/2001 | Balakrishnan et al. | |
| 6,272,025 B1 | 8/2001 | Riggio et al. | |
| 6,307,361 B1 | 10/2001 | Yaakov et al. | |
| 6,437,994 B1 | 8/2002 | Blom et al. | |
| 6,462,966 B1 | 10/2002 | Leung et al. | |
| 6,469,917 B1 | 10/2002 | Ben-Yaakov | |
| 6,545,882 B2 | 4/2003 | Yang | |

(Continued)

OTHER PUBLICATIONS

CN 200880002882.8—First Chinese Office Action issued Sep. 26, 2011 (9 pages).

(Continued)

*Primary Examiner* — Shawn Riley
(74) *Attorney, Agent, or Firm* — Blakely Sokoloff Taylor & Zafman LLP

(57) ABSTRACT

A resonant mode power converter is controlled with a control unit including a current limiting circuit coupled to receive a first current representative of a power converter output and a second current generated in response to a reference voltage. The current limiting circuit is coupled to limit the first current in response to the second current. An oscillator is coupled to receive the first current to generate a control signal having a control frequency in response to the first current. The power converter output is controlled in response to the control frequency of the control signal.

9 Claims, 4 Drawing Sheets

U.S. PATENT DOCUMENTS

| | | | |
|---|---|---|---|
| 6,728,121 | B2 | 4/2004 | Ben-Yaakov et al. |
| 6,839,247 | B1 | 1/2005 | Yang et al. |
| 6,903,536 | B2 | 6/2005 | Yang |
| 6,969,978 | B2 | 11/2005 | Dening |
| 7,042,743 | B2 | 5/2006 | Pidutti et al. |
| 7,184,280 | B2 | 2/2007 | Sun et al. |
| 7,436,685 | B2 | 10/2008 | Li et al. |
| 7,440,297 | B2 | 10/2008 | Adragna et al. |
| 7,821,237 | B2 | 10/2010 | Melanson |
| 7,821,801 | B2 | 10/2010 | Janson et al. |
| 7,848,117 | B2 | 12/2010 | Reinberger et al. |
| 7,885,085 | B2 | 2/2011 | Orr et al. |
| 7,911,812 | B2 | 3/2011 | Colbeck et al. |
| 7,916,506 | B2 * | 3/2011 | Zhang et al. ............... 363/21.02 |
| 8,014,172 | B2 | 9/2011 | Reinberger et al. |
| 8,031,489 | B2 * | 10/2011 | Wang et al. ............... 363/21.06 |
| 8,036,000 | B2 * | 10/2011 | Ying et al. ............... 363/21.02 |
| 8,085,563 | B2 | 12/2011 | Gaboury et al. |
| 2003/0223255 | A1 | 12/2003 | Ben-Yaakov et al. |
| 2007/0063684 | A1 | 3/2007 | Adragna et al. |
| 2007/0242487 | A1 | 10/2007 | Orr |
| 2008/0197817 | A1 | 8/2008 | Colbeck et al. |
| 2008/0198638 | A1 | 8/2008 | Reinberger et al. |
| 2009/0091957 | A1 | 4/2009 | Orr et al. |
| 2009/0316454 | A1 | 12/2009 | Colbeck et al. |
| 2011/0044074 | A1 | 2/2011 | Reinberger et al. |
| 2011/0095734 | A1 | 4/2011 | Orr et al. |
| 2011/0134670 | A1 | 6/2011 | Colbeck et al. |

OTHER PUBLICATIONS

EP 09 150 478.7—European Search Report dated Apr. 28, 2009 (3 pages).

EP 09 150 478.7—European Office Action dated Aug. 26, 2009 (4 pages).

CN 200880002853.1—First Chinese Office Action issued Aug. 5, 2011 (8 pages).

"NCP1395A/B: High Performance Resonant Mode Controller," ON Semiconductor®, Rev. 1, Mar. 2006 (27 pages).

CN 200880002863.5—Chinese First Office Action with English Translation, issued Aug. 1, 2011 (16 pages).

Fairchild Semiconductor, "Application Note 42047; Power Factor Correction (PFC) Basics," Rev.0.9.0, Aug. 19, 2004 (11 pages).

Fairchild Semiconductor, "FAN4803; 8-Pin PFC and PWM Controller Combo," Rev. 1.2.3, Nov. 2, 2004, p. 1.

ON Semiconductor, "Overview of Power Factor Correction Approaches," Power Factor Correction Handbook, Chapter 1, HBD853/D, Rev. 2, Aug. 2004, pp. 5-17.

Ben-Yaakov et al., "The Dynamics of a PWM Boost Converter with Resistive Input," IEEE Transactions on Industrial Electronics, vol. 46, No. 3, Jun. 1999, pp. 613-619.

Adragna, "AN1792 Application Note; Design of Fixed-Off-Time-Controlled PFC Pre-Regulators with the L6562," STMicroelectronics, Nov. 2003, pp. 1-30.

Yang, "LLC Resonant Converter," Chapter 4, *Topology Investigation for Front End DC/DC Power Conversion for Distributed Power System*, (dissertation submitted to the Faculty of Virginia Polytechnic Institute and State University), Sep. 12, 2003, pp. 94-114.

STMicroelectronics, "AN2321 Application Note; Reference Design: High Performance, L6599-based HB-LLC Adapter with PFC for Laptop Computers," Aug. 2006, pp. 1-29.

STMicroelectronics, "AN2393 Application Note; Reference Design: Wide Range 200W L6599-based HB LLC Resonant Converter for LCD TV & Flat Panels," Sep. 2006, pp. 1-37.

STMicroelectronics, "L6563 L6563A; Advanced Transition-Mode PFC Controller," Nov. 2006, pp. 1-37.

STMicroelectronics, "L6599; High-Voltage Resonant Controller," Jul. 2006, pp. 1-36.

PCT/CA2008/000108—PCT International Search Report and Written Opinion, dated Apr. 15, 2008.

PCT/CA2008/000109—PCT International Search Report and Written Opinion, dated May 7, 2008.

PCT/CA2008/000111—PCT International Search Report and Written Opinion, dated May 1, 2008.

PCT/CA2008/000108—International Preliminary Report on Patentability and Written Opinion, dated Jul. 28, 2009.

PCT/CA2008/000109—International Preliminary Report on Patentability and Written Opinion, dated Jul. 28, 2009.

PCT/CA2008/000111—International Preliminary Report on Patentability and Written Opinion, dated Jul. 28, 2009.

CN 200880002863.5—Chinese Second Office Action with English Translation, issued Mar. 28, 2012 (18 pages).

* cited by examiner

CONTROL ARRANGEMENT FOR A RESONANT MODE POWER CONVERTER

REFERENCE TO RELATED APPLICATIONS

This application is a continuation of U.S. Non-Provisional patent application Ser. No. 12/939,058, filed Nov. 3, 2010, now pending, which is a continuation of U.S. Non-Provisional patent application Ser. No. 12/016,933, filed Jan. 18, 2008, now issued as U.S. Pat. No. 7,848,117 B2, which claims the benefit and priority of U.S. Provisional Patent Application No. 60/881,480, filed Jan. 22, 2007, entitled "Cascaded Power Converters And Control Arrangement Therefor," which is now expired. The U.S. Provisional Patent Application No. 60/881,480, U.S. Non-Provisional patent application Ser. No. 12/939,058 and U.S. Pat. No. 7,848,117 B2 are hereby incorporated by reference.

Reference is directed to the following U.S. Non-Provisional patent application Ser. Nos. 12/016,950 and 12/016,945 filed simultaneously with the U.S. Non-Provisional patent application Ser. No. 12/016,933, referenced above, claiming separate inventions, the entire contents and disclosures of each of which is hereby incorporated herein by reference:

"Control Arrangement For A PFC Power Converter," R. Colbeck et al., (U.S. Non-Provisional patent application Ser. No. 12/016,950, filed Jan. 18, 2008, now issued as U.S. Pat. No. 7,911,812);

"Cascaded PFC And Resonant Mode Power Converters," R. On et al., (U.S. Non-Provisional patent application Ser. No. 12/016,945, filed Jan. 18, 2008, now issued as U.S. Pat. No. 7,885,085).

BACKGROUND INFORMATION

1. Field of the Disclosure

This invention relates to a control arrangement for a resonant mode power converter.

2. Background

It is known to provide a cascade of a boost converter for PFC followed by a PWM (pulse width modulation) buck converter for producing a lower voltage than the typically high output voltage of the PFC converter, and to operate these in a synchronized manner using a single clock reference. Such cascaded converters are described for example in Hwang U.S. Pat. No. 5,565,761, issued Oct. 15, 1996 and entitled "Synchronous Switching Cascade Connected Off-Line PFC-PWM Combination Power Converter Controller", and Hwang et al. U.S. Pat. No. 5,798,635, issued Aug. 25, 1998 and entitled "One Pin Error Amplifier And Switched Soft-Start For An Eight Pin PFC-PWM Combination Integrated Circuit Converter Controller".

Another arrangement comprising cascaded PFC and PWM power converters is known from Fairchild Semiconductor Application Note 42047 entitled "Power Factor Correction (PFC) Basics", Rev. 0.9.0, Aug. 19, 2004. Various PFC arrangements and their control are known for example from Chapter 1, entitled "Overview of Power Factor Correction Approaches", of "Power Factor Correction (PFC) Handbook", ON Semiconductor document HBD853/D, Rev. 2, August 2004, and from "The Dynamics of a PWM Boost Converter with Resistive Input" by S. Ben-Yaakov et al., IEEE Transactions on Industrial Electronics, Vol. 46, No. 3, June 1999, pp. 613-619, describing an indirect PFC converter control scheme.

It is desirable for the converter switching frequency to be relatively high, in order to reduce the sizes of reactive components. However, switching losses increase with increasing switching frequency, resulting in practical upper limits to the switching frequencies that can be used.

It is also known to reduce the PWM power converter switching losses by using a resonant mode power converter, taking advantage of zero voltage switching (ZVS) and/or zero current switching (ZCS). Examples of resonant mode converters include series resonant, parallel resonant, series parallel resonant or LCC, and LLC converters examples of which using a half bridge converter topology are described in Chapter 4, entitled "LLC Resonant Converter", of "Topology Investigation for Front End DC/DC Power Conversion for Distributed Power System", by Bo Yang in a dissertation submitted to the Faculty of the Virginia Polytechnic Institute and State University, Sep. 12, 2003. Among such resonant mode converters, an LLC converter is preferred for reasons explained in the dissertation.

An LLC power converter is also known for example from Blom et al. U.S. Pat. No. 6,437,994, issued Aug. 20, 2002 and entitled "LLC Converter Includes A Current Variation Detector For Correcting A Frequency Adjusting Control Signal Of An Included Difference Detector".

An LLC converter has two resonant frequencies, namely a series resonant frequency and a parallel resonant frequency, and is typically designed to operate in a range between these resonant frequencies in which the gain of the circuit is negative, meaning that an increase in frequency decreases the energy transferred to the output of the converter. For example with a half bridge topology, the half bridge current lags the half bridge voltage due to a primarily inductive nature of the resonant tank in this range, so that the LLC can be operated to advantage with ZVS.

An LLC converter is thus operated with a variable frequency switching waveform, which is a substantially square waveform with dead times to avoid simultaneous conduction of the half bridge switches. A higher frequency corresponds to a lighter load. Although a particular LLC converter may be designed for operation over a relatively narrow range of frequencies, different LLC converters for use in different applications, and with potentially different input voltages, may be required to operate in very different frequency ranges over a wide frequency band.

STMicroelectronics Application Notes AN2321, "Reference design: high performance, L6599-based HB-LLC adapter with PFC for laptop computers", August 2006 and AN2393, "Reference design: wide range 200 W L6599-based HB LLC resonant converter for LCD TV & flat panels", September 2006 disclose cascaded PFC and half bridge LLC power converters each using an L6563 controller for the PFC converter and a separate L6599 resonant controller for the LLC converter. Reference is also directed in these respects to STMicroelectronics data sheets L6563, "Advanced transition-mode PFC controller", November 2006 and L6599, "High-voltage resonant controller", July 2006.

It is also known, from Balakrishnan et al. U.S. Pat. No. 6,249,876, issued Jun. 19, 2001 and entitled "Frequency Jittering Control For Varying The Switching Frequency Of A Power Supply", to reduce EMI (electromagnetic interference) emission by jittering the switching frequency of a switched mode power supply.

It is desirable to minimize the number of connections required for a control unit for an LLC converter, especially if the control unit is provided as an integrated circuit (IC) whether or not the IC also provides for control of a PFC converter. At the same time, it is desirable to provide for full control of the LLC converter, including for example determination of minimum and maximum switching frequencies, closed loop frequency control within the range of these frequencies, converter current sensing for overload protection, and input voltage monitoring for soft start of the LLC power converter.

In addition, it is necessary to maintain an accurate matching of the on-times of the switches of an LLC converter, over all of its potentially very large range of possible switching frequencies. While these on-times ideally would be exactly 50% of the period at any switching frequency, in practice, as is well known, it is necessary to provide dead times which reduce the on-times to slightly below 50% to avoid simultaneous conduction of the switches at the switching times. Accordingly, it is desirable for the dead times also to be closely matched. Furthermore, it is desirable that the dead times be minimized for any given switching frequency; this presents a problem in view of the wide range of possible switching frequencies of the LLC converter.

SUMMARY OF THE INVENTION

One aspect of the invention provides a method of controlling a switching frequency of a power converter having an output voltage that is dependent upon the switching frequency, comprising the steps of: producing a first current that is dependent upon the output voltage; producing a second current corresponding to a desired maximum value of the first current; limiting the first current to the desired maximum value in dependence upon the second current; and producing a control signal for the power converter with a frequency determined by the first current.

Preferably the step of producing a control signal for the power converter comprises mirroring the first current.

The step of producing a control signal for the power converter preferably comprises cyclically charging a capacitor with a current dependent upon the first current and discharging the capacitor in response to it's voltage being charged to a threshold voltage thereby to produce a sawtooth voltage waveform. The method can further comprise the step of varying the charging current of the capacitor in a pseudo-random manner, to facilitate a reduction in electromagnetic interference.

Preferably the method further comprises the step of producing two complementary switch control signals, constituting said control signal for the power converter, for controlling two switches of the power converter for conduction in alternate cycles of the sawtooth waveform with dead times between the conduction times of the two switches.

It is desirable to minimize such dead times, which are provided between conduction times of complementary switches of a power converter for which simultaneous conduction must be avoided, for example in a half bridge power converter topology. This is especially the case where, for cascaded PFC and LLC converters in which each dead time determines a keep-out zone for switching of the PFC converter, this dead time limits the duty cycle range of the PFC converter. An optimum dead time is dependent upon a normal frequency range of the resonant mode converter, which may vary within a wide frequency band.

An embodiment of the invention facilitates this by including the step of determining each dead time in dependence upon the second current.

The method preferably includes the step of providing a desired minimum value of the first current.

In an embodiment of the invention, the step of limiting the first current comprises the steps of: coupling differential inputs of an amplifier respectively to a voltage reference and a junction point to which the first current is supplied; mirroring the second current via a first transistor to a second transistor; conducting the first current via a third transistor to the second transistor; controlling the third transistor in dependence upon an output of the amplifier; and changing a voltage at the junction point in response to a change of voltage at the output of the amplifier.

The method preferably includes the step of modifying the first current by a current of a capacitor being charged via a resistor to change the switching frequency of the power converter for soft starting of the power converter.

Another aspect of the invention provides a control unit for a resonant mode converter having an output voltage that is dependent upon a switching frequency of the converter, comprising: a feedback circuit for providing a first current dependent upon the output voltage of the converter; a resistor for producing a second current from a reference voltage; a circuit for limiting the first current to the second current; and an oscillator circuit for producing a control signal for the converter at a frequency dependent upon the first current thereby to control said output voltage.

Preferably the circuit for limiting the first current to the second current comprises a current minor circuit for minoring the second current.

The oscillator circuit can comprise a capacitor, a current mirror circuit responsive to the first current for supplying a charging current to the capacitor, and a comparator circuit responsive to the capacitor being charged to a threshold voltage for discharging the capacitor thereby to produce a sawtooth voltage waveform.

Preferably the control unit further comprises a circuit for producing two complementary switch control signals, constituting said control signal for the converter, for controlling two switches of the converter for conduction in alternate cycles of the sawtooth waveform, and a timer for producing dead times between the two complementary switch control signals. Advantageously the timer is responsive to the second current for determining each dead time in dependence upon the second current.

The control unit can and include a resistor for providing a current constituting a minimum value of the first current.

The circuit for limiting the first current to the second current can comprise: an amplifier having differential inputs coupled respectively to a voltage reference and a junction point to which the first current is supplied; a current mirror comprising a first transistor to which the second current is supplied and a second transistor; a third transistor via which the first current is conducted to the second transistor, the third transistor being controlled by an output of the amplifier; and a circuit for changing a voltage at the junction point in response to a change of voltage at the output of the amplifier.

The control unit preferably includes a capacitor in series with a resistor for modifying the first current by a charging current of the capacitor for soft starting of the converter.

the invention also extends to the combination of a resonant mode converter, having an output voltage that is dependent upon a switching frequency of the converter, and a control unit as recited above arranged to control a switching frequency of the converter with said control signal. Preferably the resonant mode converter comprises an LLC converter.

BRIEF DESCRIPTION OF THE DRAWINGS

The invention and aspects thereof will be further understood from the following description by way of example with reference to the accompanying drawings, in which.

DETAILED DESCRIPTION

Figure 1:
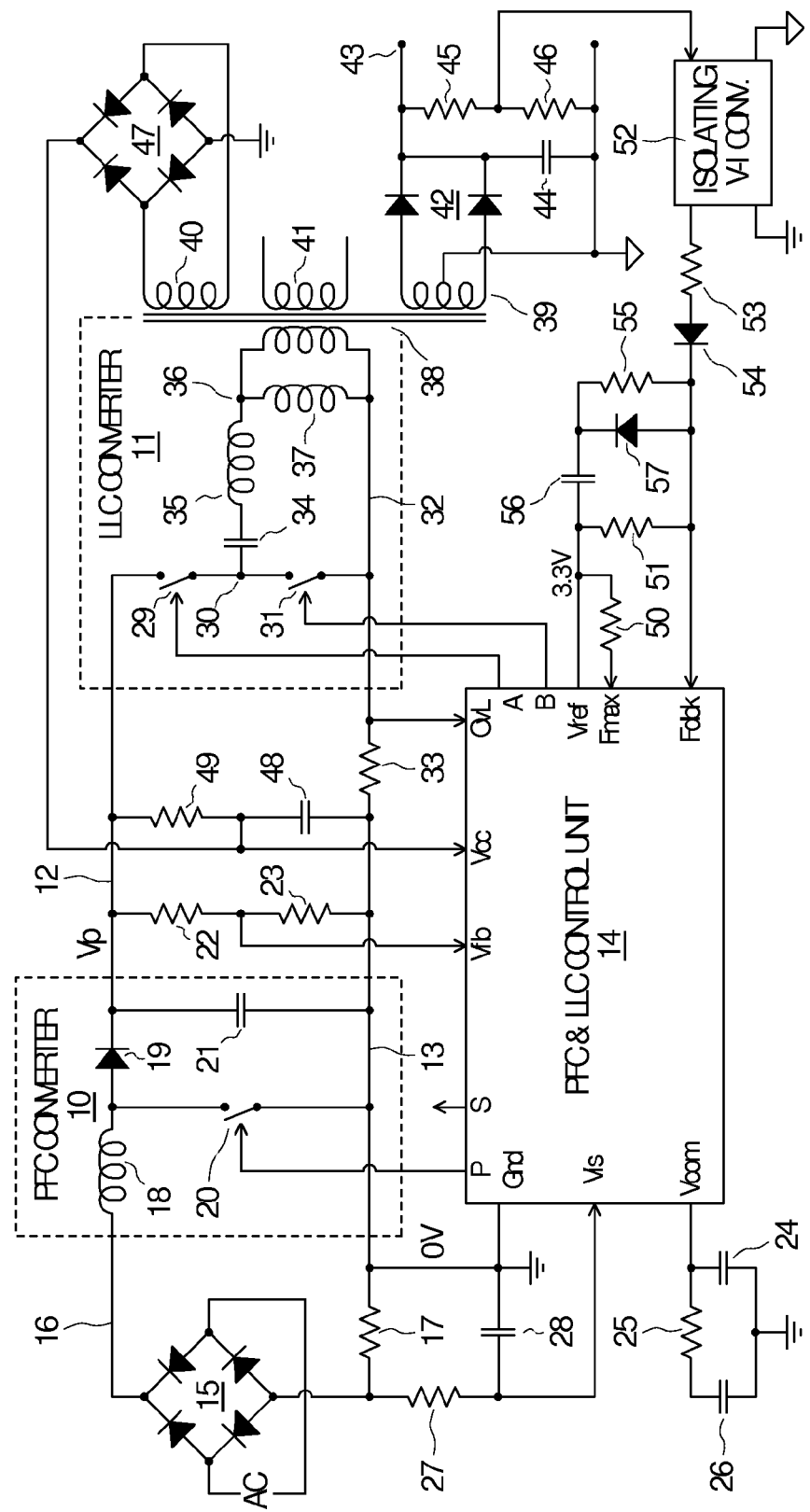
FIG. 1 schematically illustrates a power supply arrangement, including cascaded PFC and LLC power converters and a control arrangement for the converters, in accordance with an embodiment of the invention.

A power supply arrangement as illustrated in FIG. 1 includes a PFC power converter 10 and an LLC power converter 11, the converters being shown within broken line boxes. The converters 10 and 11 are cascaded, a positive output voltage Vp of the PFC converter 10, produced on a line 12 relative to a zero-volt (0V) line 13 connected to ground as shown, being connected as an input voltage for the LLC converter 11. The cascaded PFC and LLC power converters 10 and 11 are controlled as described further below by a PFC and LLC control unit 14, which has a ground connection Gnd connected to the line 13.

AC power supplied to an input of the power supply arrangement is rectified by a diode bridge 15. A positive rectified AC output of the diode bridge 15 is coupled via a line 16 to a positive voltage input of the PFC converter 10, and a return path is provided from the 0V line 13 to the diode bridge 15 via a current sensing resistor 17. By way of example, the line 16 may have a peak voltage in a range of about 125V to about 360V, depending on a voltage of the AC power, and the voltage Vp on the line 12 may be about 385V.

The PFC converter 10 shown in FIG. 1 comprises a conventional boost converter including an input inductor 18 and a diode 19 coupled in series between the line 16 and the line 12, a controlled switch 20, typically constituted by a MOSFET, coupled between a junction of the inductor 18 with the diode 19 and the 0V line 13, and an output capacitor 21 coupled between the lines 12 and 13. The switch 20 is controlled to be opened and closed by an output P of the control unit 14. Another output S of the control unit 14, not connected in FIG. 1, is provided for complementary control (with dead times) of a secondary switch (not shown) which may be provided in other forms of PFC converter.

A voltage divider comprising resistors 22 and 23 connected in series between the lines 12 and 13 supplies to a voltage feedback input Vfb of the control unit 14 a voltage proportional to the output voltage Vp of the PFC converter 10. Within the control unit 14, this voltage is supplied to a transconductance amplifier having an output coupled to a compensation point Vcom of the control unit 14, from which a capacitor 24, and a resistor 25 in series with a capacitor 26, are connected to ground or 0V. A negative voltage (relative to ground or 0V), produced at the junction of the current sensing resistor 17 with the diode bridge 15 and proportional to input current of the PFC converter 10, is coupled to another input Vis of the control unit 14 via a low pass filter constituted by a series resistor 27 and a shunt capacitor 28.

It is noted that the control unit 14 does not monitor the input voltage of the PFC converter 10, but only the input current and the output voltage Vp. The control unit 14 controls an off-time duty cycle Doff of the PFC converter switch 20 in accordance with:

$$Doff = Vi/Vp = Re*Is/Vp$$

where Vi is the input voltage on the line 16, Is is the input current sensed by the current sensing resistor 17, and Re is the equivalent load of the PFC converter reflected to its input, over a wide frequency range to provide a near-unity power factor for the power supply arrangement.

The LLC converter 11 has a half bridge topology comprising a primary switch 29 between the converter input voltage line 12 and a junction point 30, and a secondary switch 31 between the junction point 30 and a line 32 of the converter. The switches 29 and 31, which typically comprise MOSFETs, are controlled in a complementary manner, with dead times so that they are not simultaneously conductive, by outputs A and B respectively of the control unit 14. The line 32 is coupled to the 0V line 13 via a current sensing resistor 33 providing a return path of the LLC converter 11, and is connected to an input OvL of the control unit 14 to which it supplies a voltage proportional to input current of the LLC converter 11.

The junction point 30 is coupled to an output junction 36 of the LLC converter 11 via a capacitor 34 and a series inductor 35, the junction 36 being coupled via another inductor 37 to the line 32. The inductors 35 and 37, and the capacitor 34, constitute the LLC components of the converter 11. Outputs of the LLC converter 11 are taken from secondary windings of a transformer 38, which has a primary winding connected between the junction 36 and the line 32. In FIG. 1 the transformer 38 is represented as an "ideal" transformer, separate from the inductors 35 and 37. In practice, part or all of the inductances of the inductors 35 and 37 can be constituted by leakage and magnetizing inductances of the transformer 38, so that functions of these inductors and the transformer are combined.

The transformer 38 can have any desired number of secondary windings; three secondary windings 39, 40, and 41 are shown by way of example in FIG. 1. The winding 39 has a centre tap, connected to a secondary side ground, and ends connected via full wave rectifier diodes 42 to an output 43. A smoothing capacitor 44 is connected between the output 43 and the secondary side ground, so that the output 43 provides a DC voltage output for equipment (not shown) powered by the power supply arrangement. A voltage divider, comprising resistors 45 and 46 connected in series between the output 43 and the secondary side ground, provides a voltage feedback for the LLC converter 11 as is further described below.

The secondary winding 40 is coupled to a diode bridge 47 whose negative output is connected to the primary side ground or 0V and whose positive output, smoothed by a capacitor 48 connected between this positive output and the 0V line 13, provides a supply voltage to an input Vcc of the control unit 14 for powering the control unit in a bootstrapped manner. To this end, a high impedance resistor 49 is also connected between the output line 12 of the PFC converter 10 and the input Vcc.

On connection of AC power to the power supply arrangement of FIG. 1, a small current flows via the inductor 18, diode 19, and resistor 49 to charge the capacitor 48, and the supply voltage at the input Vcc of the control unit 14 rises. On this reaching a start-up voltage of, for example, about 13V, this is detected by the control unit 14 which accordingly starts to drive the LLC converter 11, thereby to produce an output voltage via the secondary winding 40 and the diode bridge 47 to maintain charge of the capacitor 48 to a desired operating voltage of the control unit 14, for example about 12V. The initial operation of the control unit 14 reduces the charge of the capacitor 48, but not sufficiently to fall below a shut-down threshold voltage, of for example about 8.5V.

The secondary winding 41, to which no connections are shown in FIG. 1, is representative of any number of other secondary windings of the transformer 38 which may be used to provide other desired AC and/or DC outputs at high or low voltages, as may be desired. It can be appreciated that functions of the secondary windings can be combined, so that the transformer 38 can have one or more secondary windings.

The supply voltage at the input Vcc of the control unit 14 can be used by the control unit 14 to provide a sufficiently high voltage to drive the switches 20, 29, and 31 of the converters 10 and 11. In addition, the control unit 14 uses this supply voltage to produce at an output Vref a regulated supply voltage; this supply voltage is also used within the control unit 14 for powering most of its circuits. In addition, using the unregulated and/or regulated supply voltages the control unit 14 powers a bandgap voltage reference (not shown) and derives various threshold voltages for use in operation of the control unit. By way of example, the regulated supply voltage is assumed to be 3.3V as shown in FIG. 1, and other voltages and voltage ranges referred to below are given in the context of this supply voltage.

A resistor 50 is connected between the output Vref of the control unit 14 and an input Fmax of the control unit, to which it supplies a current which determines a desired maximum switching frequency of the LLC converter 11. Another resistor 51 is connected between the output Vref of the control unit 14 and an input Fdbk of the control unit, to which it supplies a current which determines a desired minimum switching frequency of the LLC converter 11. An electrically isolating voltage-to-current (V-I) converter 52 produces at its output an error current which is supplied via a series resistor 53 and a diode 54 to the input Fdbk of the control unit 14 for feedback control of the frequency of the LLC converter 11 within the range determined by the resistors 50 and 51. This feedback error current is proportional to a difference between the voltage at the junction between the resistors 45 and 46, supplied to the converter 52 and representing the voltage at the DC output 43, and a reference voltage (not shown), and can be produced in a frequency compensated manner for example along the lines shown in FIG. 1 of Application Note AN2321 referred to above.

An additional circuit, comprising a resistor 55 in series with a capacitor 56 between the input Fdbk and the output Vref of the control unit 14, and optionally with a diode 57 in parallel with the resistor 55 as shown in FIG. 1, provides for a soft start of the LLC converter 11 under no-load or light load conditions, whereby the switching frequency is reduced gradually from its maximum to a normal operating value.

Figure 2:
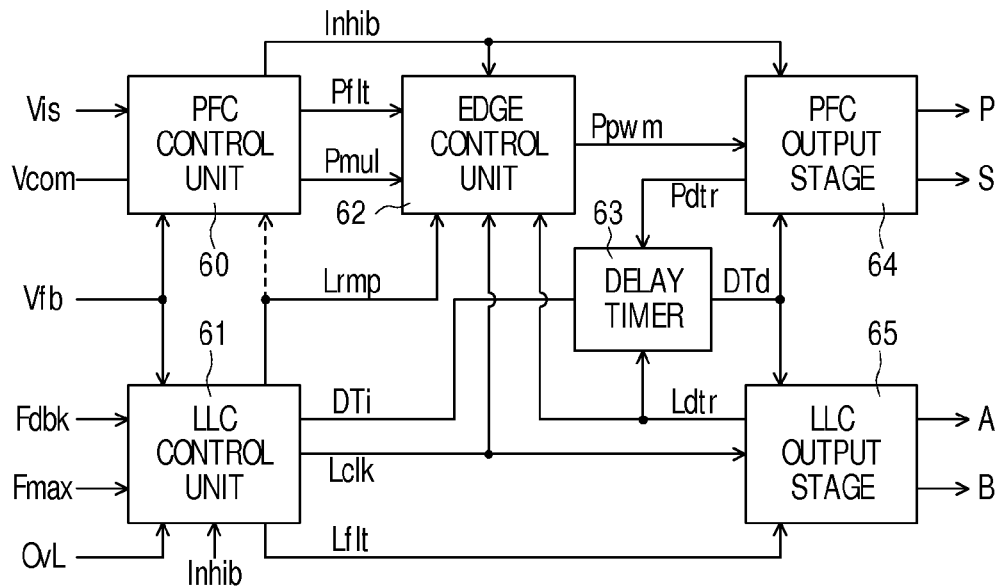
FIG. 2 illustrates in a block diagram parts of one form of a PFC and LLC control unit of the control arrangement of FIG. 1.

FIG. 2 shows a block diagram of parts of one form of the PFC and LLC control unit 14 of the power supply control arrangement of FIG. 1. These parts comprise a PFC control unit 60, an LLC control unit 61, an edge control unit 62, a delay timer 63, a PFC output stage 64, and an LLC output stage 65. For simplicity other parts of the control unit 14, such as for voltage regulation, producing desired threshold voltages, programming desired settings, and test purposes, are not shown.

Except for the connections Gnd, Vcc, and Vref which are not shown in FIG. 2, FIG. 2 shows the same external connections of the control unit 14, using the same references, as FIG. 1. These references are also used to refer to signals at the respective connections. FIG. 2 also shows various signals that are produced within and exchanged among various parts of the control unit in operation, as described further below. Functions of the blocks shown in FIG. 2 and the related signals are briefly described as follows.

The PFC control unit 60 is supplied with the PFC current sensing voltage Vis and the PFC feedback voltage Vfb, and also has a connection to the compensation point Vcom to which the components 24 to 26 are connected as described above. These components are selected for a voltage at the point Vcom of typically 0.5 to 2.5V with a PFC control loop bandwidth of the order of about 10 to 20 Hz. The PFC control unit 60 compares the feedback values Vis and Vfb with over-current and over-voltage threshold values respectively, and in response to an over-current or over-voltage condition of the PFC converter 10 determined by these comparisons it produces a PFC fault signal Pflt which is supplied to the edge control unit 62. The PFC control unit 60 also compares the feedback voltage Vfb with an inhibit threshold voltage, and in response to an under-voltage condition (e.g. in the event of AC brown-out or failure) determined by this comparison produces an inhibit signal Inhib which is supplied to the LLC control unit 61, the edge control unit 62, and the PFC output stage 64.

In normal operating conditions, the PFC control unit 60 processes the feedback signals Vis and Vfb to produce a signal Pmul, which is supplied to the edge control unit 62, which is directly proportional to the off-time duty cycle Doff required for the PFC converter 10 at any instant to provide the desired power factor correction in accordance with the above equation for Doff. Thus throughout each rectified AC cycle of the PFC input voltage on the line 16 in FIG. 1, the off-time duty cycle Doff, as represented by the signal Pmul, is varied by the PFC control unit 60 to present an equivalent substantially resistive load to the AC supply. By way of example, the signal Pmul can have a value from 0 to 2.0V for representing off-time duty cycles from 0 to 100%.

The PFC control unit 60 can optionally use a ramp signal Lrmp, which is produced by the LLC control unit 61 as described below, which can be supplied to the PFC control unit 60 as shown by a dashed line in FIG. 2.

The LLC control unit 61 is supplied with the signal Fdbk, which as described above is a current representing an error voltage of the LLC converter, and uses this to produce a controlled frequency square waveform clock signal Lclk which is supplied to the LLC output stage 65, and also to the edge control unit 62. The LLC control unit 61 also produces a sawtooth or ramp signal Lrmp which is supplied to the edge control unit 62 and, optionally as described above, to the PFC control unit 60. For example the ramp signal Lrmp has an amplitude from 0 to 2.0V and a frequency which is twice the frequency of the clock signal Lclk. As indicated above, a minimum frequency of the LLC clock signal Lclk is set by a minimum current supplied to the input Fdbk via the resistor 51, and a maximum frequency of the LLC clock signal Lclk is set by the resistor 50 supplying a current via the input Fmax to a current mirror arrangement in the LLC control unit 61. For example the maximum frequency may be set to a value about 2 or 3 times a normal LLC operating frequency for a particular application, with the minimum frequency being lower than this normal operating frequency. The normal operating frequency typically is in a narrow frequency range, but may be selected from a wide frequency band, for example of the order of about 50 kHz to about 1 MHz, for any particular application of the LLC converter.

The LLC control unit 61 also produces a signal DTi for the delay timer 63, this signal being a current that is produced by the current minor arrangement in the LLC control unit 61 in dependence upon the current supplied to its input Fmax. The delay timer 63 determines a dead time in dependence upon the current signal DTi, so that the dead time is adjusted for the wide range of possible LLC frequencies.

In addition, the LLC control unit 61 is supplied with the inhibit signal Inhib to inhibit generation of the signals Lrmp and Lclk when the signal Inhib is asserted. The LLC control unit 61 is further supplied via the input OvL with the voltage dropped across the resistor 33 and representing input current of the LLC converter 11, and compares this with at least one threshold to determine a possible overload condition of the LLC converter, in response to which it produces an LLC fault signal Lflt which is supplied to the LLC output stage 65. The LLC control unit 61 is also supplied with the PFC feedback voltage signal Vfb, which it compares with a threshold to enable start-up of the LLC converter only when the PFC converter output voltage Vp is above a selected level, for example 360V. A soft start function in the LLC control unit 61 operates in conjunction with the components 55 to 57 in FIG. 1 as indicated above to provide a soft start when the LLC converter is enabled and after any overload fault.

The edge control unit 62 compares the duty cycle signal Pmul with the LLC ramp signal Lrmp to produce a PFC PWM signal Ppwm with the desired duty cycle, this signal being supplied to the PFC output stage 64. The signal Ppwm is harmonically related to the LLC clock signal Lclk, which is also supplied to the edge control unit 62, conveniently in a 1:1 or same-frequency relationship. The edge control unit 62 produces the signal Ppwm with edges or transitions that are timed to avoid coinciding with edges of the signal Lclk, for minimum interference, and with a phase for maximum efficiency of the power supply arrangement. To this end the edge control unit 62 is also supplied with a signal Ldtr produced by the LLC output stage 65 as described below, and which is high during dead times of the LLC output stage. The edge control unit 62 is further supplied with the signals Pflt and Inhib, in response to either of which it inhibits the signal Ppwm.

The delay timer 63 is responsive to a PFC delay time request signal Pdtr supplied to it from the PFC output stage 64, or an LLC delay time request signal Ldtr supplied to it from the LLC output stage 65, to produce a delay time done signal DTd, which is supplied to each of these output stages 64 and 65, after a delay time that is determined as indicated above by the signal DTi, whereby the delay time is adjusted to suit the normal operating frequency of the LLC converter 11 (and the switching frequency of the PFC converter 10 which is here assumed to be the same).

The PFC output stage 64 comprise a level shifter and gate driver for producing the output P for driving the primary switch 20 of the PFC converter 10 in accordance with the signal Ppwm and unless it is inhibited by the signal Inhib, with a similar arrangement for driving the output S in a complementary manner, with dead times, to avoid undesired simultaneous conduction of PFC converter switches, provided by the delay timer 63 as described above. The PFC output stage 64 can include more complex arrangements for producing various relative timings of its output signals P and S to suit different switching arrangements that may be required for different types of PFC converter.

The LLC output stage 65 also comprises level shifters and gate drivers for producing its output signals A and B for driving the switches 29 and 31 respectively of the LLC converter 11, unless these are inhibited by the signal Lflt, at the frequency of the signal Lclk and with dead times, to avoid simultaneous conduction of the switches 29 and 31, provided by the delay timer 63 as described above.

Particular forms of the LLC control unit 61 and the delay timer 63 are described in greater detail and by way of example below. Particular forms of other parts of the PFC and LLC control unit 14 are described in greater detail and by way of example in the related applications referred to above.

It is noted that the LLC control unit described below can in some respects be compared with the STMicroelectronics L6599 controller as described in the data sheet for that device referred to above. As described in particular in section 7 of that data sheet, one pin (pin 4) of the L6599 controller is held at a reference voltage while sourcing a current that determines the frequency of an oscillator, and hence the switching frequency of a controlled resonant mode converter. The current is determined by a feedback signal to a photo-transistor and is limited to a maximum value, determining a maximum frequency of the oscillator, by a resistor RFmax in series with the photo-transistor, and has a minimum value, determining a minimum frequency of the oscillator, set by another resistor RFmin from the pin to ground. A resistor-capacitor circuit from the pin to ground facilitates providing a soft-start function, using another pin (pin 1) connection for discharging the capacitor of this circuit. A further pin (pin 3) provides for connection of a main capacitor of the oscillator.

In this known controller, the main capacitor of the oscillator is alternately charged and discharged so that its voltage varies in accordance with a triangular waveform with approximately equal voltage ramps up and down which determine the on-times of the converter switches. However, as shown in FIG. 21 of the data sheet, charging and discharging currents of this main capacitor flow via different paths and through transistors of opposite polarity types, so that they may not be precisely matched and consequently the on-times of the converter switches may undesirably be unequal.

In addition, as shown in the block diagram on the first page of this data sheet a dead time block is used to determine the switching dead times, specified in Table 4 of the data sheet as a minimum of 0.2, typically 0.3, and a maximum of 0.3 microseconds. Thus in this controller the dead time is fixed regardless of the switching frequency of the controlled converter as determined by the oscillator.

Figure 3:
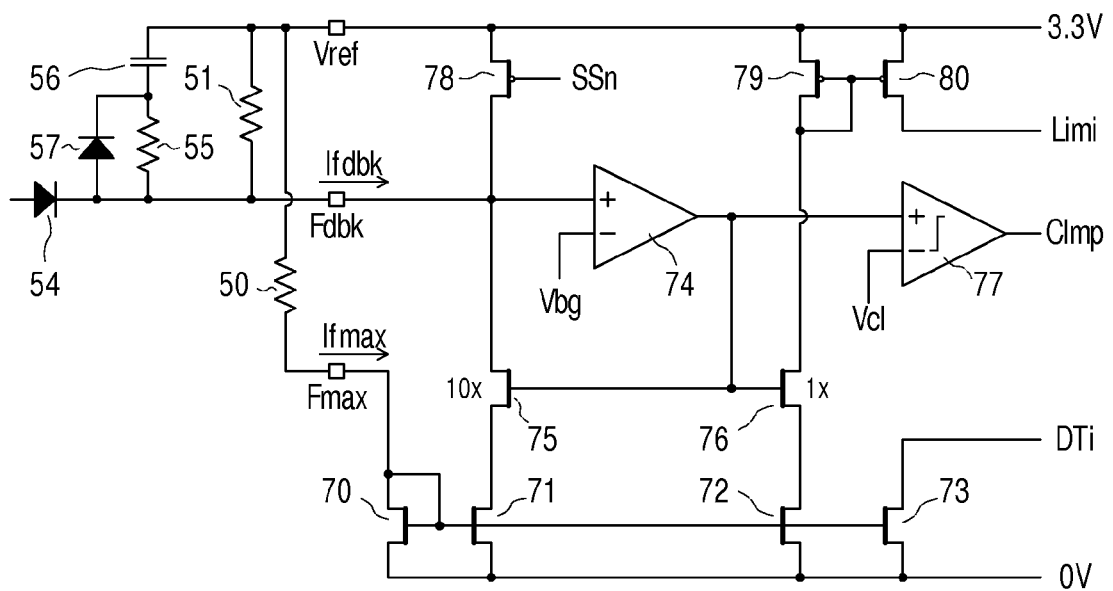
FIGS. 3, 4, and 5 schematically illustrate parts of an LLC control unit of the PFC and LLC control unit of FIG. 2 in accordance with an embodiment of the invention.
Figure 4:
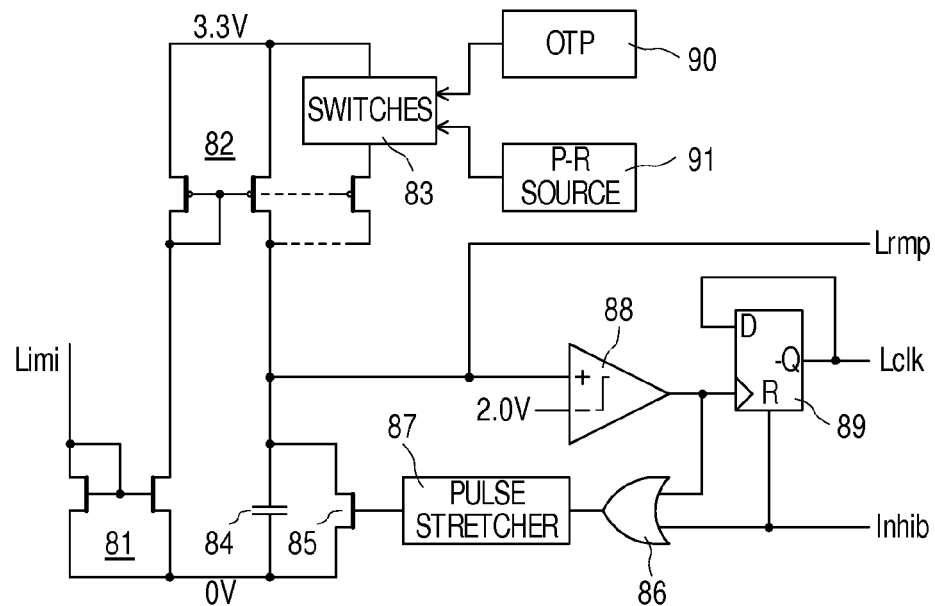
Figure 5:
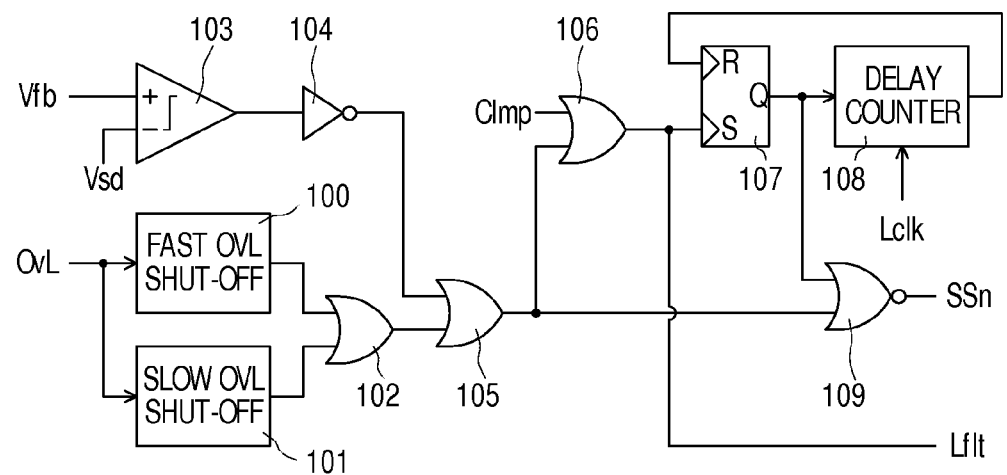

Referring again to the accompanying drawings, FIGS. 3, 4, and 5 schematically illustrate parts of a particular form of the LLC control unit 61. FIG. 3 shows parts of the control unit 61 for producing a control current signal Limi for controlling the frequency of the LLC converter, a clamp signal Clmp which is described further below, and the current signal DTi referred to above. FIG. 3 also shows the components 50, 51, and 54 to 57 connected to the output Vref and the inputs Fdbk and Fmax in the same manner as in FIG. 1. FIG. 4 shows an oscillator arrangement of the LLC control unit 61 for producing the signals Lrmp and Lclk in dependence upon the current signal Limi. FIG. 5 shows overload protection and slow start parts of the LLC control unit 61.

Referring to FIG. 3, the LLC control unit 61 includes a current minor arrangement comprising N-channel transistors 70 to 73. The transistor 70 is diode-connected with its gate and drain connected to the input Fmax, and hence via the resistor 50 to the 3.3V supply voltage Vref. Consequently, a fixed current Ifmax, determined by the resistance of the resistor 50 and a voltage drop across this resistor, is conducted to ground or 0V via the transistor 70. This current Ifmax determines a maximum frequency of the LLC converter 10 as further described below, and can be determined by appropriate selection of the resistor 50 to be anywhere within the wide frequency band in which the LLC converter may be desired to operate. Mirroring of this current Ifmax enables other parameters to be determined suitably for the maximum frequency, and hence the frequency range, for operation of any particular LLC converter. Such parameters include the delay time, determined from the mirrored current DTi, as further described below. It is noted in contrast that in the known L6599 arrangement as discussed above, the resistor RFmax only limits feedback current and hence maximum frequency, and does not permit determination of any other parameters.

The drain voltage of the transistor 70 is typically 0.6 to 0.9V. A more precise voltage at the input Fmax, and hence a more precise setting of the current Ifmax, can alternatively be provided by an amplifier arrangement coupled to the input Fmax, for example similar to the arrangement of the amplifier 74 in relation to the input Fdbk as described below.

The current Ifmax in the transistor 70 is mirrored by the transistor 73 to produce the current DTi for the delay timer 63. As described further below, a ramp generator in the delay timer 63 has a similar form to a ramp generator of the LLC control unit oscillator. Consequently the dead time determined by the delay timer 63 is adjusted according to the current Ifmax to be suitable for the applicable LLC clock frequency within the wide frequency band, and there is a coarse compensation between characteristics of the delay timer 63 and the LLC clock frequency.

The input Fdbk is connected to a non-inverting input of a differential amplifier 74, to an inverting input of which is supplied a voltage Vbg, for example about 1.25V from the bandgap reference voltage. An output of the amplifier 74 is connected to the gates of two N-channel transistors 75 and 76, which have a 10:1 current ratio as indicated in FIG. 3, and to a non-inverting input of a comparator 77, to an inverting input of which is supplied a voltage clamp comparison voltage Vcl and which produces the clamp signal Clmp at its output. The transistor 75 has its source connected to the drain of the transistor 71 and its drain connected to the input Fdbk, which is also coupled to the 3.3V supply voltage by a P-channel transistor 78 controlled by an active-low soft start signal SSn supplied to its gate. The transistor 76 is connected in the drain path of the transistor 72 to another current mirror formed by P-channel transistors 79 and 80, to produce the control current signal Limi.

In a steady operating state in which the signal SSn is high and the capacitor 56 has a constant charge, the components 55 to 57 and 78 have no effect. The amplifier 74 and the transistor 75 form a closed loop which normally acts to maintain the voltage Vbg at the input Fdbk. As described above, a current proportional to an output voltage derived from the LLC converter 11 is supplied via the diode 54 to the input Fdbk. The resistor 51 also supplies to the input Fdbk a current equal to the voltage, normally Vref-Vbg, across this resistor divided by the resistance of this resistor 51. Thus a current Ifdbk equal to the sum of these input currents is normally supplied to the input Fdbk and is conducted to ground or 0V via the transistors 75 and 71. This current Ifdbk is mirrored in a 10:1 ratio by the transistor 76 (the transistor 76 passes a current equal to Ifdbk/10), and the resulting current is mirrored as the control signal current Limi to determine the LLC clock frequency as described below. Consequently, the control signal current Limi, and hence the LLC clock signal frequency, is controlled by the feedback current through the diode 54, and a minimum current and hence a minimum frequency is determined by the resistance of the resistor 51. Thus the minimum frequency can also be determined to be anywhere within the wide frequency band in which the LLC converter may be desired to operate by appropriate selection of the resistor 51.

Thus the two resistors 50 and 51, externally of an integrated circuit implementing the control unit, determine maximum and minimum frequencies of the LLC converter 11 anywhere within a wide band of possible frequencies as described above, using only two integrated circuit inputs. One (Fdbk) of these is also used for the feedback signal, and the other (Fmax) provides a current that can be used to determine not only the maximum frequency, but also the dead time and other parameters as may be desired.

In the normal operating condition described above, the current Ifdbk passed by the transistors 75 and 71 is less than the current Ifmax passed by the transistor 70, and the output voltage of the amplifier 74 is less than the voltage Vcl so that the signal Clmp is low. An increase of the feedback current via the diode 54, and hence of the current Ifdbk, corresponding to an increase in the output voltage of the LLC converter at the output 43, for example due to a reduced LLC converter load, results in an increased control signal current Limi, and hence an increased frequency of the LLC clock frequency, which produces a reduced output of the LLC converter in accordance with its negative gain-frequency characteristics.

Current through the transistors 75 and 71 is limited to the current Ifmax through the transistor 70. If the current Ifdbk attempts to rise beyond this, then the closed loop formed by the amplifier 74 and the transistor 75 can no longer maintain the voltage Vbg at the input Fdbk, and the voltage at this input Fdbk rises. Consequently the output voltage of the amplifier 74 rises above the voltage Vcl, and the comparator 77 produces a high level of the clamp signal Clmp, in response to which (via an OR gate 106 as shown in FIG. 5) the signal Lflt is asserted to inhibit the LLC output stage 65 in FIG. 2, resulting in the output of the LLC converter 10 decreasing. Thus the LLC converter frequency is limited to the maximum frequency set by the resistor 50.

The signal SSn is asserted (with a low level) on start-up of the LLC converter and in response to fault conditions, as described further below, to turn on the transistor 78 for at least a minimum delay determined by a counter, thereby pulling the input Fdbk to the 3.3V supply voltage Vref and discharging the capacitor 56 via the resistor 55, or quickly via the diode 57 if it is present. The high level of the input Fdbk results in a minimal current into the input Fdbk, a high level of the signal Clmp being produced or maintained, and the signal current Limi being at its maximum of Ifmax/10 corresponding to the maximum frequency of the LLC clock signal Lclk.

On removal of the low level of the signal SSn, the capacitor 56 is charged via the resistor 55, the charging current flowing into the input Fdbk and forming part of the current Ifdbk. As the capacitor 56 charges, the current Ifdbk falls gradually from Ifmax to a lower stable value, the frequency of the LLC clock signal Lclk is accordingly reduced gradually from its maximum value to a lower stable operating value, and the high level of the signal Clmp is ended, the voltage at the input Fdbk again becoming equal to Vbg through the feedback loop provided by the amplifier 74 and the transistor 75. The resistor 55 and the capacitor 56 can provide a relatively long time constant, for example of the order of about 100 s or more. This soft start function reduces the load that the LLC converter 11 presents, on start-up, to the PFC capacitor 21.

As the current Ifdbk provided at the input Fdbk determines the switching frequency of the LLC converter 11 and hence its output voltage, the LLC control unit 61 can be sensitive to noise at this input. Noise sensitivity can be reduced in a variety of ways such as debouncing or low pass filtering the current at this input, or reducing bandwidth of the circuit including the amplifier 74. However, it is observed that some ripple at this input Fdbk, for example 120 Hz ripple from the AC supply, may be beneficial in producing a spectral spread of the LLC converter switching frequency which can potentially reduce electromagnetic interference. Noise at the input Fdbk can also occur differently in a pattern of alternate cycles of the LLC oscillator, corresponding to the two different switching states of the LLC converter, possibly adversely affecting the necessary equal timing of these states. This disadvantage can be avoided by providing a sample and hold function at the input Fdbk, so that the same value of the feedback current Ifdbk is used for determining at least two successive cycles of the LLC oscillator and hence facilitating equal timing of the two LLC converter switching states.

Referring to FIG. 4, the oscillator arrangement of the control unit 61, for producing the signals Lrmp and Lclk in dependence upon the control signal current Limi, comprises a current mirror 81 formed by N-channel transistors, a current mirror 82 formed by P-channel transistors and having multiple outputs (for example with binary weightings) which are selectively connected in parallel by switches 83, a capacitor 84, an N-channel transistor 85, an OR gate 86, a pulse stretcher 87, a comparator 88, and a flip-flop 89 having a clock input which is shown in conventional manner, an inverting output –Q, a data input D connected to this output –Q, and a reset input R.

As shown in FIG. 4, the current Limi is mirrored by the current mirror 81, an output current of which is mirrored by the current mirror 82 to produce a current for charging the capacitor 84. The switches 83 are programmed, by one-time programming (OTP) represented by a block 90, for calibration of the current supplied by the current minor 82 thereby to compensate for manufacturing process variations, a dominant one of which is typically the capacitance of the capacitor 84. In addition, the switches 83 can be controlled by a pseudo-random (P-R) signal source 91 to dither the charging current of the capacitor 84, and hence to dither the LLC switching frequency produced as described below, in a manner to reduce EMI by spreading its spectrum.

A voltage to which the capacitor 84 is charged, constituting the LLC ramp signal Lrmp, is supplied to a non-inverting input of the comparator 88, an inverting input of which is supplied with a comparison voltage, of 2.0V as shown, which corresponds to the maximum amplitude of the signal Lrmp. An output of the comparator 88 is supplied to the clock input of the flip-flop 89, whose –Q output constitutes the LLC clock signal Lclk, and drives the pulse stretcher 87 via the OR gate 86. An output of the pulse stretcher 87 controls the gate of the transistor 85, which has its drain-source path connected in parallel with the capacitor 84. The inhibit signal Inhib is supplied to the reset input of the flip-flop 89 and to a second input of the OR gate 86, to inhibit generation of the signals Lrmp and Lclk when the signal Inhib is high.

Consequently, the capacitor 84 is repeatedly charged linearly at a rate proportional to the signal current Limi and calibrated and optionally dithered by the switches 83, until it reaches the maximum voltage of 2.0V and the comparator 88 produces a high output, toggling the flip-flop 89 and turning on the transistor 85 to discharge the capacitor 84 rapidly to 0V, restoring a low level at the output of the comparator 88. The pulse stretcher 87 provides a sufficiently long on period, of for example 50 ns or less, for the transistor 85 to discharge the capacitor 84 fully, while still providing a sufficiently fast edge of the sawtooth or ramp signal Lrmp.

It can thus be appreciated that the LLC ramp signal Lrmp is a linear sawtooth at a frequency determined by the feedback current Ifdbk, and that the LLC clock signal Lclk is a square waveform at half this frequency, up to a maximum clock frequency corresponding to the maximum current Ifmax. Further, this control arrangement enables the clock frequency to be varied over the wide band of possible frequencies of the LLC converter 11.

FIG. 5 shows overload protection and soft start parts of the control unit 61. These parts comprise fast and slow overload (OVL) shut-off circuits 100 and 101 respectively, OR gates 102, 105, and 106, a comparator 103, an inverter 104, an edge-triggered RS flip-flop 107, a delay counter 108, and a NOR gate 109.

The circuit 100 compares the voltage of the OvL input with a threshold representing a relatively high overload of the LLC converter 11, and produces a high output via the OR gate 102 immediately if the threshold is exceeded. The circuit 101 compares the voltage of the OvL input with a lower threshold representing a smaller overload of the LLC converter 11, and produces a high output via the OR gate 102 if this threshold is repeatedly exceeded. In either case a high output of the gate 102 indicates an overload condition. The comparator 103 compares the voltage of the input Vfb, representing the output voltage of the PFC converter 10 which is the input voltage of the LLC converter 11, with a shutdown threshold Vsd below which the LLC converter 10 is to be turned off, in this event producing a low output which is inverted by the inverter 104. The outputs of the gate 102 and the inverter 104 are combined in the OR gate 105, the output of which is supplied to the gates 106 and 109. The OR gate 106 is also supplied with the clamp signal Clmp, its output constituting the signal Lflt. A rising edge of this output of the gate 106 sets the flip-flop 107 to enable the delay counter 108. The delay counter counts a desired number, for example 1024, of cycles of the LLC clock signal Lclk and then produces an output which resets the flip-flop 107. The output Q of the flip-flop 107 is also connected to an input of the NOR gate 109, the output of which constitutes the active-low soft start signal SSn.

Consequently, in the event of an overload of the LLC converter 11, an under-voltage at the output of the PFC converter 10, or a clamped state as described above, the signal Lflt is asserted to inhibit the output of the LLC converter 11, and a low value of the signal SSn is produced to pull the input Fdbk high as described above, the latter condition being maintained for at least the period counted by the delay counter 108 to allow time for the capacitor 56 to be fully discharged. At the end of this period, when the flip-flop 107 is reset, the low level of the signal SSn is ended if the output of the gate 105 is low, i.e. if there is no overload or under-voltage condition, but the high level of the signal Clmp remains while the LLC clock signal gradually falls from its maximum frequency to a stable operating frequency as described above. The signal Clmp then goes low to end the high level of the signal Lflt and enable the LLC output stage 65.

Figure 6:
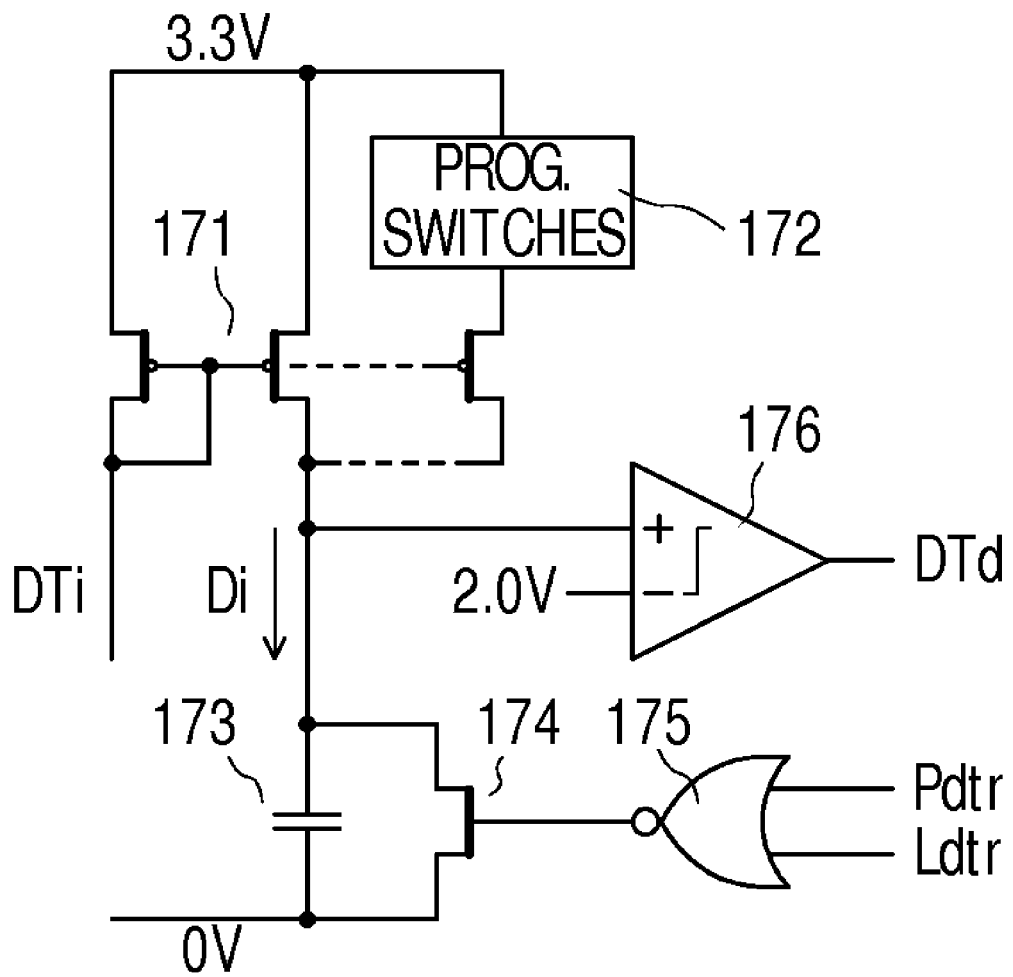
FIG. 6 schematically illustrates one form of a delay timer of the control unit of FIG. 2.

FIG. 6 shows a particular form of the delay timer 63, in which the current DTi is mirrored by a current minor 171, constituted by P-channel transistors with multiple outputs selectively connected in parallel by programmable switches 172, to produce a calibrated current Di for charging a capacitor 173. The switches 172 are programmed to compensate for manufacturing process variations, in particular for the capacitor 173.

An N-channel transistor 174 has its drain-source path in parallel with the capacitor 173 and its gate connected to the output of a NOR gate 175 whose inputs are supplied with the signals Pdtr and Ldtr, so that a voltage across the capacitor 173 is held at zero until one of the signals Pdtr and Ldtr goes high at the start of a requested dead time. Then the capacitor 173 is charged, with its voltage, supplied to a non-inverting input of a comparator 176 to an inverting input of which is supplied a threshold voltage of 2.0V as shown, rising linearly until it reaches the threshold at the end of the dead time, the comparator state then changing to produce a high value at its output constituting the signal DTd. In response to the high value of the signal DTd, a high value of the signal Ldtr is ended in the LLC output stage 65 for example as described below; a high value of the signal Pdtr is similarly ended in the PFC output stage 64. It is observed that the signals Pdtr and Ldtr can not both be high simultaneously.

It will be appreciated that the form of the delay timer 63 as shown in FIG. 6 is similar to the form of the oscillator as shown in FIG. 4, so that in any individual integrated circuit implementing both of these there can be an approximate correlation of their characteristics. As a result, the delay time can be well matched to the maximum switching frequency of the LLC converter.

Although the above description relates to an LLC converter using a half bridge topology, the invention can also be applied to other resonant mode converters and to other power converter topologies, for example to a full bridge topology in a similar manner. It can also be applied in a similar manner to controlling the switching of other power converters, not shown, which may be provided in addition to the PFC and LLC converters, for example to one or more flyback or other PWM converters that may be desired for providing additional supply voltages such as may be desired for standby and/or operating power for equipment powered by the power supply arrangement.

Although particular forms of the power supply arrangement and control units are described above by way of example, numerous modifications, variations, and adaptations may be made thereto.

What is claimed is:

1. A control unit for use in a resonant mode power converter, comprising:
 a current limiting circuit coupled to receive a first current representative of a power converter output and a second current generated in response to a reference voltage, the current limiting circuit coupled to limit the first current in response to the second current; and
 an oscillator coupled to receive the first current, the oscillator coupled to generate a control signal having a control frequency in response to the first current, wherein the power converter output is controlled in response to the control frequency.

2. The control unit of claim 1 wherein the current limiting circuit comprises a first current mirror coupled to receive the first current and the second current, wherein the first current mirror is coupled to limit the first current in response to the second current.

3. The control unit of claim 1 wherein the oscillator comprises:
 a second current minor coupled to generate a charging current in response to the first current;
 a capacitor coupled to the second current mirror, the capacitor coupled to be charged in response to the charging current; and
 a comparator coupled to the capacitor and coupled to receive a threshold voltage, wherein the capacitor is coupled to be discharged in response to the threshold voltage received by the comparator to generate a sawtooth control signal having the control frequency in response to the first current.

4. The control unit of claim 3 further comprising a pseudo-random signal source coupled to the second current mirror to dither the charging current such that the control frequency is dithered in response to the pseudo-random signal source to reduce electromagnetic interference (EMI).

5. The control unit of claim 3 further comprising a switch control signal generator coupled to receive the control signal having the control frequency, the switch control signal generator coupled to generate first and second complementary switch control signals in response to the control signal having the control frequency.

6. The control unit of claim 5 further comprising two switches of the power converter coupled to receive the first and second complementary switch control signals, respectively, to control conduction of the two switches in alternate sawtooth control signal cycles to control the power converter output.

7. The control unit of claim 6 further comprising a delay timer coupled to generate dead times between the first and second complementary switch control signals in response to the second current.

8. The control unit of claim 1 further comprising a resistor coupled to a capacitor and coupled to a reference voltage to modify the first current to reduce gradually the control frequency from a maximum to a normal operating value during a soft start of the power converter.

9. The control unit of claim 1 wherein the power converter is a resonant mode power converter comprising an LLC converter.

* * * * *